Dec. 5, 1950     C. W. SINCLAIR     2,532,824
TRACK SHOE CONNECTOR
Filed March 22, 1944     2 Sheets-Sheet 1
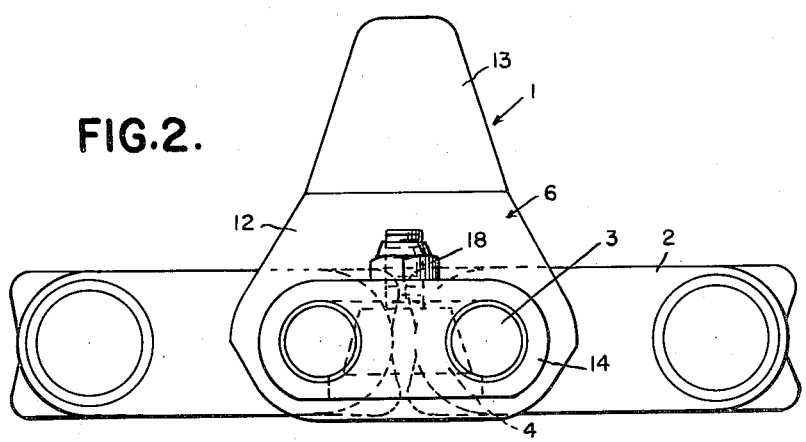
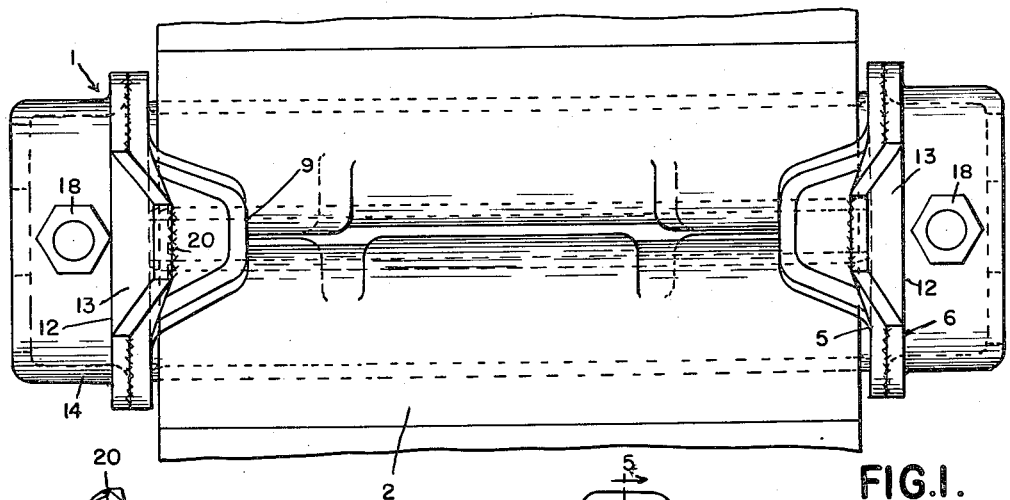
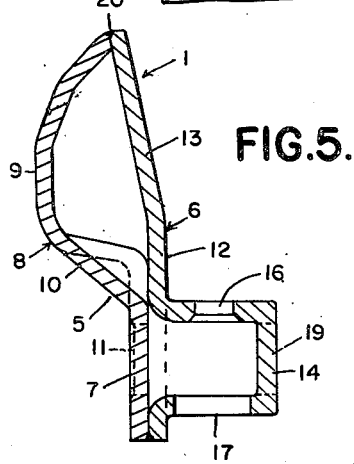
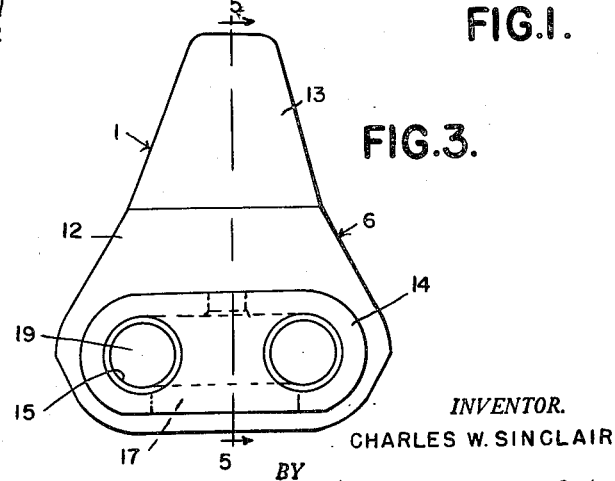
INVENTOR.
CHARLES W. SINCLAIR
BY
ATTORNEYS Dec. 5, 1950 C. W. SINCLAIR 2,532,824
TRACK SHOE CONNECTOR
Filed March 22, 1944 2 Sheets-Sheet 2

INVENTOR.
CHARLES W. SINCLAIR
BY
Whittemore Hulbert & Belknap,
ATTORNEYS

Patented Dec. 5, 1950

2,532,824

UNITED STATES PATENT OFFICE 2,532,824

TRACK SHOE CONNECTOR

Charles W. Sinclair, Detroit, Mich., assignor to Kelsey-Hayes Wheel Company, Detroit, Mich., a corporation of Delaware Application March 22, 1944, Serial No. 527,616

2 Claims. (Cl. 305—10)

The invention relates to vehicle tracks and refers more particularly to end connectors for pivotally connecting to each other adjacent shoes of a track.

The invention has for one of its objects to provide an end connector that may be readily manufactured to take the place of a forged end connector now in general use.

The invention has for another object to form the end connector of sheet metal fashioned in a manner to require relatively little machining.

The invention has for a further object to provide an improved method of making the end connector.

With these and other objects in view, the invention resides in the novel features of construction and combinations and arrangements of parts as more fully hereinafter set forth.

In the drawings—

Figure 1 is a top plan view of a portion of a vehicle track showing an end connector embodying the invention;

Figure 2 is a side elevation thereof;

Figures 3 and 4 are opposite side elevations of the end connector only;

Figure 5 is a cross section on the line 5—5 of Figure 3;

Figure 4:
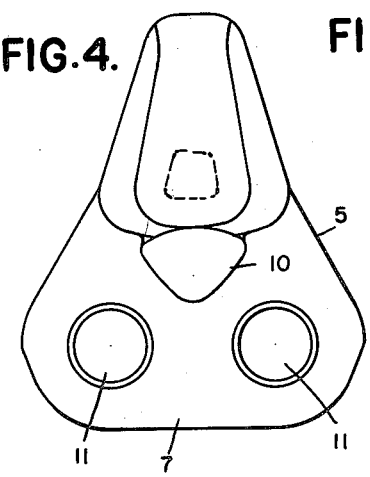
Figure 7:
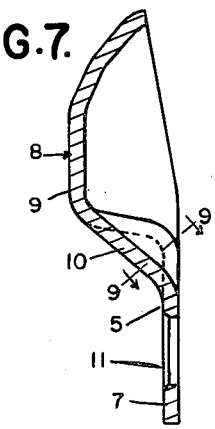
Figure 6:
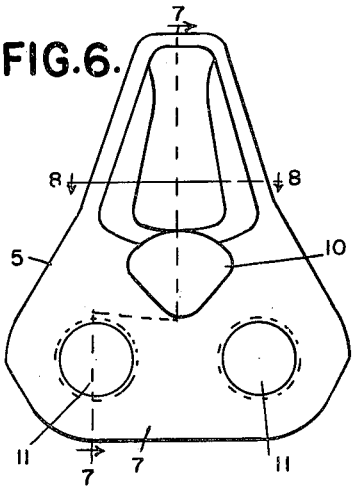
Figure 6 is a side elevation of the guide section of the end connector.
Figure 8:
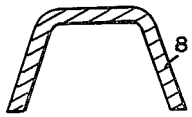
Figure 9:
Figure 12:
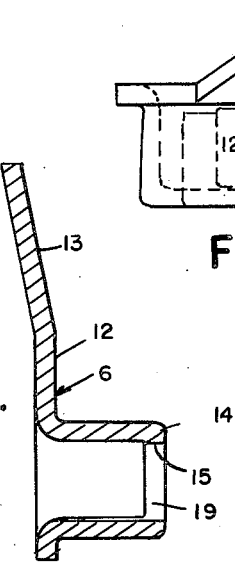
Figure 11:
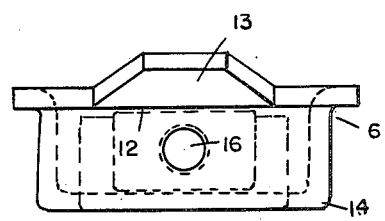
Figure 10:
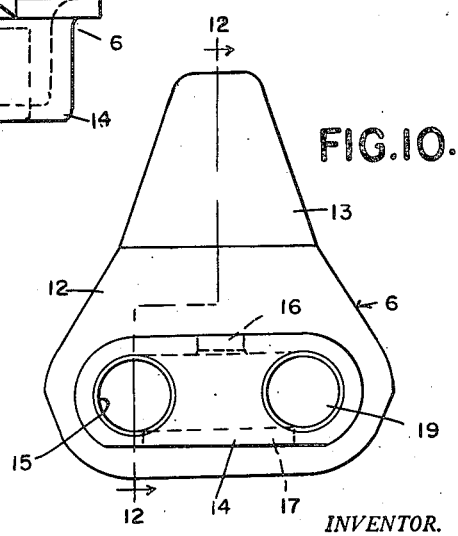

Figures 7 and 8 are cross sections on the lines 7—7 and 8—8, respectively, of Figure 6;

Figure 9 is a cross section on the line 9—9 of Figure 7;

Figure 10 is a side elevation of the drive section of the end connector;

Figure 11 is a top plan view thereof;

Figure 12 is a cross section on the line 12—12 of Figure 10.

As illustrated particularly in Figures 1 and 2, the end connector 1 pivotally connects to each other adjacent shoes 2 of a track. The connection is accomplished by means of the pins 3 which extend through the shoes and beyond their ends with corresponding ends of adjacent pins engaging bearing surfaces of the end connectors and held thereagainst by means of the wedges 4, there being a wedge for each end connector.

Each end connector is formed of sheet metal and, more particularly, comprises the inside stamping or guide section 5 and the outside stamping or drive section 6, the stampings or sections being fixedly secured to each other to form a unit. The inside stamping or guide section 5 is formed from a flat sheet steel blank and has the flat base 7 and the hollow boss 8 with the boss having the substantially flat face 9 laterally offset from the flat base. The inside stamping or guide section is reinforced by the rib 10 which extends between the flat base and the substantially flat face. The flat base is provided with the pair of spaced holes 11 through which the pins 3 extend. The outside stamping or drive section 6 is formed from a flat sheet steel blank and has the flat base 12, the extension 13 and the hollow boss 14 which extends laterally from the base and is elongated in a direction transversely of or at right angles to the extension and has the opposed internal arcuate bearing surfaces 15 at its ends. The bearing surfaces engage the pins 3 and each has a radius to fit a pin. The top wall of the boss 14 is formed with the hole 16, while the bottom wall is formed with the hole 17, the latter being sufficiently large to permit the wedge 4 being passed therethrough and the former being sufficiently large to receive the threaded shank of the wedge which is engageable by the nut 18 to secure the wedge in place. The web of the hollow boss 14 is formed with the pair of holes 19, the axes of which are in substantially axial alignment with the centers of radii of the bearing surfaces 15 and with the axes of the holes 11. The holes 19 permit the pins 3 to extend therethrough. The two stampings or sections are fixedly secured together with their bases opposed and in contact with each other and with the extension opposed to and closing the hollow guiding boss. The two stampings or sections are united throughout their entire outer contours by means of the welding or brazing material 20. Both stampings or sections are hardened by heat treating to give them the required strength to withstand the stresses to which they are subject in use. Also, the substantially flat face of the inside stamping or guide section is hardened to have long life, this being the face which is engageable with the various wheels, including bogie wheels, serving to guide the shoes forming the track.

In the manufacture of the end connector a flat sheet steel blank is die-pressed to form the inside stamping or guide section 5 having the flat base 7, the hollow boss 8 with the latter provided with the substantially flat face 9 laterally offset from the base and the reinforcing rib 10 connecting the flat base and the substantially flat face. The two holes in the base are preferably punched out during the pressing operation. Also a flat sheet steel blank is die-pressed to form the outside stamping or drive section 6 having the flat base 12, the extension 13 and the hollow elongated boss 14 extending laterally from the base and provided with the opposed internal arcuate bearing surfaces 15 at its ends. The holes in the web of the boss are produced by a suitable punching operation which is preferably carried out at the time of forming the outside stamping or drive section by die-pressing. The holes in the top and bottom walls, respectively, of the boss are then punched out. The two stampings or sections are then assembled with the bases 7 and 12 in opposed relation and with the boss 8 and extension 13 in opposed relation and the extension closing the boss, after which the two sections are fixedly united, as by being welded or brazed to each other around the entire outer contour at 20. The next step consists in heat treating the assembled sections to produce the desired hardness, this being accomplished by heating to approximately 1600° F. and then quenching and finally drawing at substantially 900° F. The substantially flat surface 9 of the boss 8 is then hardened to produce a good wearing surface for contacting with the guiding means of the track and this hardening is accomplished by localized induction heating and quenching. The holes 11 and 19 are then finished by being reamed, although it is apparent that they may be reamed before the induction hardening.

What I claim as my invention is:

1. An end connector for adjacent shoes of a vehicle track comprising a sheet metal guide stamping having a base and a boss with the latter provided with a guiding surface laterally offset from said base, and a sheet metal drive stamping fixedly secured to said guide stamping and having a base opposed to said first mentioned base, an extension closing said boss, and a boss extending laterally from said last mentioned base and having opposed internal bearing surfaces.

2. An end connector for adjacent shoes of a vehicle track comprising a sheet metal stamping having a flat base and a hollow boss with a guide surface laterally offset from said boss and a sheet metal stamping having a flat base, an extension and a hollow boss extending laterally from said last mentioned base and formed with internal bearing surfaces, said stampings being opposed, said first mentioned boss being closed by said extension, said first mentioned and second mentioned bases being opposite each other, said first mentioned base and said second mentioned boss having holes in axial alignment with said bearing surfaces, and said second mentioned boss having holes in its top and bottom walls.

CHARLES W. SINCLAIR.

REFERENCES CITED

The following references are of record in the file of this patent:

UNITED STATES PATENTS

| Number | Name | Date |
|---|---|---|
| 2,039,012 | Lindberg | Apr. 28, 1936 |
| 2,067,269 | Johnson et al. | Jan. 12, 1937 |
| 2,290,109 | Mayne | July 14, 1942 |
| 2,330,245 | Schonitzer et al. | Sept. 28, 1943 |
| 2,330,246 | Schonitzer et al. | Sept. 28, 1943 |
| 2,353,124 | Burgess | July 11, 1944 |